US011397033B2

(12) United States Patent
Xie et al.

(10) Patent No.: US 11,397,033 B2
(45) Date of Patent: Jul. 26, 2022

(54) REFRIGERATION SYSTEM AND CONTROL METHOD FOR STARTING REFRIGERATION SYSTEM

(71) Applicant: Carrier Corporation, Palm Beach Gardens, FL (US)

(72) Inventors: Kangshan Xie, Shanghai (CN); Linhui Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 256 days.

(21) Appl. No.: 16/628,562

(22) PCT Filed: Jul. 3, 2018

(86) PCT No.: PCT/US2018/040700
§ 371 (c)(1),
(2) Date: Jan. 3, 2020

(87) PCT Pub. No.: WO2019/010171
PCT Pub. Date: Jan. 10, 2019

(65) Prior Publication Data
US 2020/0215877 A1    Jul. 9, 2020

(30) Foreign Application Priority Data
Jul. 4, 2017 (CN) .......................... 201710536724.1

(51) Int. Cl.
*F25B 40/00*    (2006.01)
*B60H 1/00*    (2006.01)
(Continued)

(52) U.S. Cl.
CPC ........... *F25B 40/00* (2013.01); *B60H 1/0045* (2013.01); *B60H 1/00357* (2013.01);
(Continued)

(58) Field of Classification Search
CPC .. B60H 1/3222; B60H 1/3214; B60H 1/3208; B60H 1/00885; B60H 1/00485;
(Continued)

(56) References Cited

U.S. PATENT DOCUMENTS 4,122,686 A    10/1978 Lindahl et al.
4,270,884 A    6/1981 Lintonbon et al.
(Continued)

FOREIGN PATENT DOCUMENTS

CN    101158495 A    4/2008
CN    103335463 A    10/2013
(Continued)

OTHER PUBLICATIONS

Chinese Office Action for Application No. 201710536724.1; dated Apr. 2, 2021; 10 Pages.
(Continued)

*Primary Examiner* — Nelson J Nieves
(74) *Attorney, Agent, or Firm* — Cantor Colburn LLP

(57) ABSTRACT

A refrigeration system and a start control method for a refrigeration system. The refrigeration system includes: a refrigeration loop having an exhaust port of a compressor, a condenser, a throttle element, an evaporator, and a suction port of the compressor connected in sequence by using a flow path; wherein a first valve is disposed between the throttle element and the condenser, and the first valve is at least capable of cutting off a refrigerant flow from the throttle element to the condenser; and a second valve is disposed close to the suction port of the compressor, and the second valve is used to control on/off of a flow path between the evaporator and the compressor. Starting load of the refrigeration system according to the present invention can be effectively reduced, so that the power and size of a drive component for providing power can also be reduced.

7 Claims, 2 Drawing Sheets

(51) Int. Cl.
*B60H 1/32* (2006.01)
*F25B 41/20* (2021.01)
*F25B 41/24* (2021.01)
*F25B 41/22* (2021.01)

(52) U.S. Cl.
CPC ..... *B60H 1/00485* (2013.01); *B60H 1/00885* (2013.01); *B60H 1/3208* (2013.01); *B60H 1/3214* (2013.01); *B60H 1/3222* (2013.01); *B60H 1/3232* (2013.01); *F25B 41/20* (2021.01); *F25B 41/22* (2021.01); *F25B 41/24* (2021.01)

(58) Field of Classification Search
CPC ............... B60H 1/0045; B60H 1/3232; B60H 1/00357; F25B 47/022
See application file for complete search history.

(56) References Cited

U.S. PATENT DOCUMENTS

| | | | |
|---|---|---|---|
| 4,443,156 A | 4/1984 | Dunnam, Jr. | |
| 4,966,013 A | 10/1990 | Wood | |
| 5,065,591 A | 11/1991 | Shaw | |
| 5,193,353 A * | 3/1993 | Brendel | F25B 29/003 62/196.4 |
| 5,197,297 A * | 3/1993 | Brendel | F25B 41/20 62/81 |
| 5,720,178 A | 2/1998 | Silvetti et al. | |
| 5,829,265 A | 11/1998 | Lord et al. | |
| 6,318,100 B1 * | 11/2001 | Brendel | F25B 49/022 62/217 |
| 6,321,549 B1 * | 11/2001 | Reason | B60H 1/00885 62/223 |
| 6,931,867 B2 | 8/2005 | Healy et al. | |
| 7,581,409 B2 | 9/2009 | Bailey et al. | |
| 7,814,964 B2 | 10/2010 | Greer | |
| 7,975,666 B2 | 7/2011 | Gokhale et al. | |
| 9,499,027 B2 * | 11/2016 | Steele | B60H 1/3208 |
| 2003/0205052 A1 | 11/2003 | Kim et al. | |
| 2006/0086108 A1 | 4/2006 | Manole et al. | |
| 2009/0282849 A1 | 11/2009 | Fujimoto et al. | |
| 2011/0088411 A1 * | 4/2011 | Steele | B60H 1/3216 62/61 |
| 2013/0025304 A1 | 1/2013 | Dorman | |
| 2014/0144164 A1 * | 5/2014 | Steele | B60H 1/3222 62/115 |
| 2015/0121930 A1 * | 5/2015 | Kasuya | B60H 1/00921 62/238.6 |
| 2016/0138836 A1 | 5/2016 | Senf, Jr. et al. | |
| 2016/0273813 A1 * | 9/2016 | Ramos | F16K 11/044 |
| 2017/0274732 A1 * | 9/2017 | Galansky | F25B 49/02 |
| 2018/0073791 A1 * | 3/2018 | Sun | F25B 49/027 |
| 2019/0128590 A1 * | 5/2019 | Kojima | F25B 13/00 |

FOREIGN PATENT DOCUMENTS

| | | |
|---|---|---|
| CN | 203286684 U | 11/2013 |
| CN | 105465961 A | 4/2016 |
| CN | 205351870 U | 6/2016 |
| CN | 106679253 A | 5/2017 |
| DE | 102014001929 A1 | 8/2015 |
| DE | 102014214656 A1 | 1/2016 |
| EP | 3073211 A1 | 9/2016 |
| GB | 872482 A | 7/1961 |
| JP | S5818532 A | 2/1983 |
| JP | S5979034 A | 5/1984 |

OTHER PUBLICATIONS

International Search Report and Written Opinion for application PCT/US2018/040700, dated Dec. 6, 2018, 16 pages.

* cited by examiner

REFRIGERATION SYSTEM AND CONTROL METHOD FOR STARTING REFRIGERATION SYSTEM

TECHNICAL FIELD

The present invention relates to the field of refrigeration, and in particular, the present invention relates to a start control arrangement and method for a refrigeration system.

BACKGROUND ART

Currently, as for a stand-alone unit of a transport refrigeration system, a compressor and a generator are usually driven by using an engine of the unit. In this case, during model selection for the engine, starting load of the refrigeration system needs to be taken into consideration. The starting load of the refrigeration system depends on exhaust pressure and suction pressure of the system to a great extent, and the suction pressure and exhaust pressure of the system increase as the ambient temperature rises. In some application environments, the starting load of the refrigeration system may reach an extremely high level, as a result, the selected engine needs to have a very large size. Otherwise, a fault such as a start failure may be caused.

In addition, in regions such as the Middle East where the ambient temperature difference between day and night is extremely large, the refrigerant even flows reversely in a flow path when the system is shut down. In such a process, the lubricating oil in the compressor tends to be carried out of the compressor, thus leading to greater friction between parts in the compressor during start.

SUMMARY OF THE INVENTION

The present invention is intended to provide a refrigeration system and a start control method for a refrigeration system, to reduce starting load of the refrigeration system.

According to one aspect of the present invention, a refrigeration system is provided, including: a refrigeration loop having an exhaust port of a compressor, a condenser, a throttle element, an evaporator, and a suction port of the compressor that are connected in sequence by using a flow path; wherein a first valve is disposed between the throttle element and the condenser, and the first valve is at least capable of cutting off a refrigerant flow from the throttle element to the condenser; and a second valve is disposed close to the suction port of the compressor, and the second valve is used to control on/off of a flow path between the evaporator and the compressor.

According to another aspect of the present invention, a refrigeration system is further provided, including: a refrigeration loop having an exhaust port of a compressor, a condenser, a throttle element, an evaporator, a liquid-vapor separator, and a suction port of the compressor that are connected in sequence by using a flow path; wherein a first valve is included between the throttle element and the condenser, and the first valve is at least capable of cutting off a refrigerant flow from the throttle element to the condenser.

According to still another aspect of the present invention, a start control method for a refrigeration system is provided, wherein the refrigeration system includes a refrigeration loop having an exhaust port of a compressor, a condenser, a throttle element, an evaporator, and a suction port of the compressor that are connected in sequence by using a flow path; a first valve is disposed between the throttle element and the condenser, and the first valve is at least capable of cutting off a refrigerant flow from the throttle element to the condenser; and a second valve is disposed close to the suction port of the compressor, and the second valve is used to control on/off of a flow path between the evaporator and the compressor; wherein the method includes: turning off the first valve and the second valve when the compressor is shut down.

According to yet another aspect of the present invention, a start control method for a refrigeration system is provided, wherein the refrigeration system includes a refrigeration loop having an exhaust port of a compressor, a condenser, a throttle element, an evaporator, a liquid-vapor separator, and a suction port of the compressor that are connected in sequence by using a flow path; and a first valve is included between the throttle element and the condenser, and the first valve is at least capable of cutting off a refrigerant flow from the throttle element to the condenser; wherein the method includes: turning off the first valve when the compressor is shut down.

DETAILED DESCRIPTION

Figure 1:
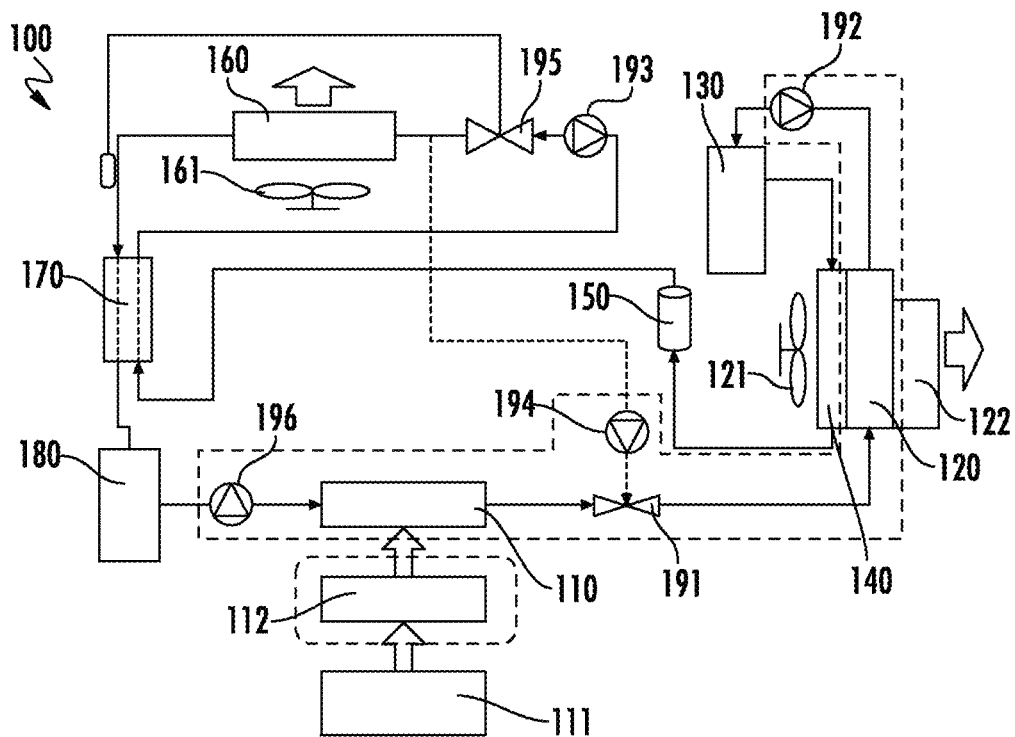
FIG. 1 is a schematic diagram of a flow path in an embodiment of a refrigeration system according to the present invention.

Referring to FIG. 1, an embodiment of a transport refrigeration system is shown. The refrigeration system 100 includes a refrigeration loop. As indispensable parts for constituting a refrigeration system, the refrigeration loop at least has an exhaust port of a compressor 110, a condenser 120, a throttle element 195, an evaporator 160, and a suction port of the compressor 110 that are connected in sequence by using a flow path. In addition, there are other auxiliary parts set up for various purposes such as energy saving, efficiency improvement, and reliability enhancement, which will be briefly introduced below.

Most critically, a first one-way valve 192 is disposed between the throttle element 195 and the condenser 120 in the refrigeration system, and a suction pressure adjustment valve 196 is disposed close to the suction port of the compressor 110. In this case, if necessary, e.g., when the compressor is shut down, the suction pressure adjustment valve 196 is turned off so that the refrigerant cannot flow into the compressor 110 from the evaporator 160; at the same time, due to the reverse cutoff function of the first one-way valve 192, the refrigerant cannot reversely flow into the compressor 110 from the evaporator 160, either. Therefore, the compressor can be closed bidirectionally, so that the refrigerant cannot flow to a suction port side or an exhaust port side of the compressor. Therefore, there is only a small amount of vapor-phase refrigerant in this closed section during the entire shutdown of the compressor, thus providing a low load condition for the next start of the compressor.

It has been found through research that the pressure difference occurring in the vapor-phase refrigerant along with the change in the ambient temperature is limited, while the pressure difference occurring in the liquid-phase refrigerant along with the change in the ambient temperature is greater. Therefore, when the refrigeration system is shut down, if the suction and exhaust sides of the compressor that are closely related to the starting load of the system are isolated from another component (such as the evaporator or a reservoir) of the system that stores a large amount of liquid-phase refrigerant, the starting load of the refrigeration system will be effectively reduced, and at the same time, the lubricating oil can be prevented from being carried away from the compressor.

It can be known according to the foregoing solution that other similar valve elements can also achieve such an effect, and the present invention is not limited to the one-way valve or the suction pressure adjustment valve. Certainly, the selection of the one-way valve is more based on the consideration of costs, while the selection of the suction pressure adjustment valve also takes into consideration the function of adjusting the suction pressure by changing an upstream opening of the compressor in a normal running condition, to achieve multiple purposes with one valve. In addition, a first valve may also be disposed between the throttle element 195 and the condenser 120 in the refrigeration system, as long as the first valve is at least capable of cutting off a refrigerant flow between the throttle element 195 and the condenser 120. For example, the first valve may be a switch valve used to control on/off of the flow path between the throttle element 195 and the condenser 120. Similarly, a second valve may also be disposed close to the suction port of the compressor, as long as the second valve is used to control on/off of a flow path between the evaporator 160 and the compressor 110. For example, the second valve may also be a switch valve used to control on/off of the flow path between the throttle element 195 and the condenser 120.

Based on the foregoing basic idea, multiple improved embodiments may be further proposed for the refrigeration system, to achieve better effects from different perspectives. Some embodiments are selected for exemplary description below.

In an embodiment, the refrigeration system further includes a reservoir 130 disposed between the throttle element 195 and the condenser 120, and the first one-way valve 192 is disposed between the reservoir 130 and the condenser 120. In this case, for selection of a downstream closed section of the compressor, a section from the throttle element 195 to the exhaust port of the compressor is further shortened to a section from the reservoir 130 to the exhaust port of the compressor. The selected location is closer to the exhaust port of the compressor, so that the closed section is more controllable.

In another embodiment, the refrigeration system further includes a liquid-vapor separator 180 arranged close to the suction port of the compressor 110, and a suction pressure adjustment valve 196 is disposed between the liquid-vapor separator 180 and the compressor 110. In this case, when the compressor is shut down, the refrigerant in the evaporator or the liquid-vapor separator is also prevented from entering the suction port side of the compressor by the suction pressure adjustment valve that is turned off.

In still another embodiment, the refrigeration system further includes a hot refrigerant bypass branch. An outlet of the hot refrigerant bypass branch is connected to a flow path between the evaporator 160 and the throttle element 195, and an inlet of the hot refrigerant bypass branch is connected to a flow path between the compressor 110 and the condenser 120. A third valve is disposed on the hot refrigerant bypass branch, and the third valve is used to control on/off of the hot refrigerant bypass branch. In this case, during shutdown, the refrigerant in the evaporator may additionally flow into the exhaust port side of the compressor through the hot refrigerant bypass branch; therefore, to avoid such a possibility, the third valve is disposed on the branch, so that the branch is totally turned off when the compressor is shut down. At the same time, when a hot refrigerant bypass function is used, a flow direction of the hot refrigerant bypass branch from the inlet to the outlet further needs to be turned on; therefore, the third valve in this case needs to be a valve having a switch function, and a one-way valve cannot be directly used. However, in a case of the following another embodiment, a one-way valve may be applied.

Alternatively, in another embodiment, the outlet of the hot refrigerant bypass branch is connected to the flow path between the evaporator 160 and the throttle element 195, and the inlet of the hot refrigerant bypass branch is connected to the flow path between the compressor 110 and the condenser 120 by using a flow path switching valve. A third one-way valve 194 is disposed on the hot refrigerant bypass branch.

It can be known according to the alternative solution that other similar valve elements can also achieve such an effect, and the present invention is not limited to the one-way valve. Certainly, the selection of the one-way valve is more based on the consideration of costs. In addition, the third valve may be disposed in the refrigerant air bypass branch, as long as the third valve is at least capable of cutting off a refrigerant flow from the outlet of the hot refrigerant bypass branch to the inlet of the hot refrigerant bypass branch. For example, the third valve may also be a switch valve used to control on/off of the hot refrigerant bypass branch.

At the same time, to support use of any embodiment of the refrigeration system, a start control method for a refrigeration system is further provided. The method at least includes: turning off the first valve 192 and the second valve 196 when the compressor 110 is shut down. In this case, a section of closed space is formed between the suction port side and the exhaust port side of the compressor, where there is only the vapor-phase refrigerant in an overheated state. In this case, even if the external ambient temperature changes greatly or has an excessively high actual value, the pressure in this closed section of pipeline will not be affected obviously, so that the pressure during the next start of the compressor is at a relatively low level. When the refrigeration system is a stand-alone diesel engine unit, the power and size of an engine for providing power to the compressor can be further reduced.

Optionally, when the refrigeration system 100 further includes the hot refrigerant bypass branch, the method further includes: turning off the third valve 194 when the compressor 110 is shut down. As such, a section of closed space where there is only the vapor-phase refrigerant is further provided for the compressor, to facilitate the next start.

Optionally, when the refrigeration system 100 further includes the alternative hot refrigerant bypass branch in the foregoing embodiment, the method further includes: when the compressor 110 is shut down, switching the flow path switching valve to being connected to the condenser 120; or switching the flow path switching valve to being connected to the hot refrigerant bypass branch, and turning off the third valve 194.

The following will describe a work state, a start state, and a shutdown state of the refrigeration system with reference to the detailed embodiment shown in FIG. 1, as well as functions of other auxiliary parts in the refrigeration system. A solid connection line between the components represents a work flow path when the refrigeration system runs normally, while a dashed connection line represents a connection flow path during hot refrigerant bypass of the refrigeration system.

When the compressor of the refrigeration system is shut down, the suction pressure adjustment valve 196 is turned off. Subsequently, the liquid-phase refrigerant usually remains in the evaporator 160 and the reservoir 130 in the shutdown state. In a clockwise direction, the remaining liquid-phase refrigerant is filtered by the liquid-vapor separator 180 and blocked by the suction pressure adjustment valve 196 and cannot flow into the suction side of the compressor 110. In a counterclockwise direction, the remaining liquid-phase refrigerant is reversely cut off by the first one-way valve 192 and cannot flow into the exhaust side of the compressor 110. In addition, due to the reverse cutoff function of the third one-way valve 194, the liquid-phase refrigerant cannot flow into the exhaust side of the compressor 110 through the hot refrigerant bypass branch, either. Therefore, a section of relatively closed space is formed between the suction side and the exhaust side of the compressor 110, where there is only the vapor-phase refrigerant. Accordingly, the compressor will not have excessively high suction and exhaust pressure, excessively high load is then avoided during the next start of the compressor, and finally the requirements for the power and size of an engine 111 are also lowered.

Figure 2:
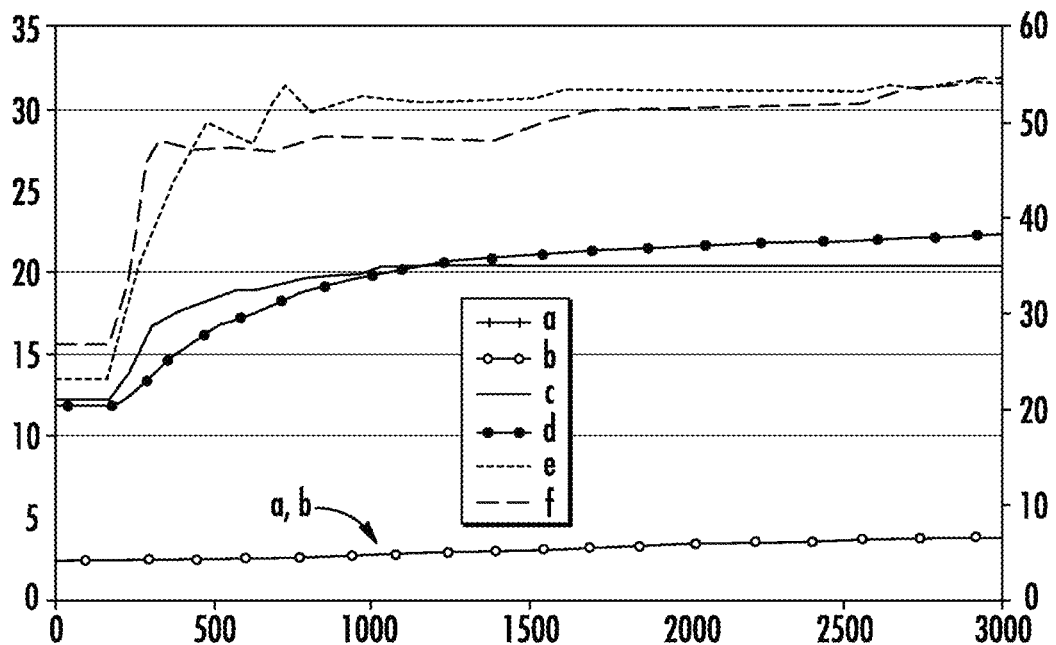
FIG. 2 is a schematic curve diagram of changes in suction and exhaust pressure and the ambient temperature from shutdown to the next start of a unit in an embodiment of a refrigeration system according to the present invention.
Figure 3:
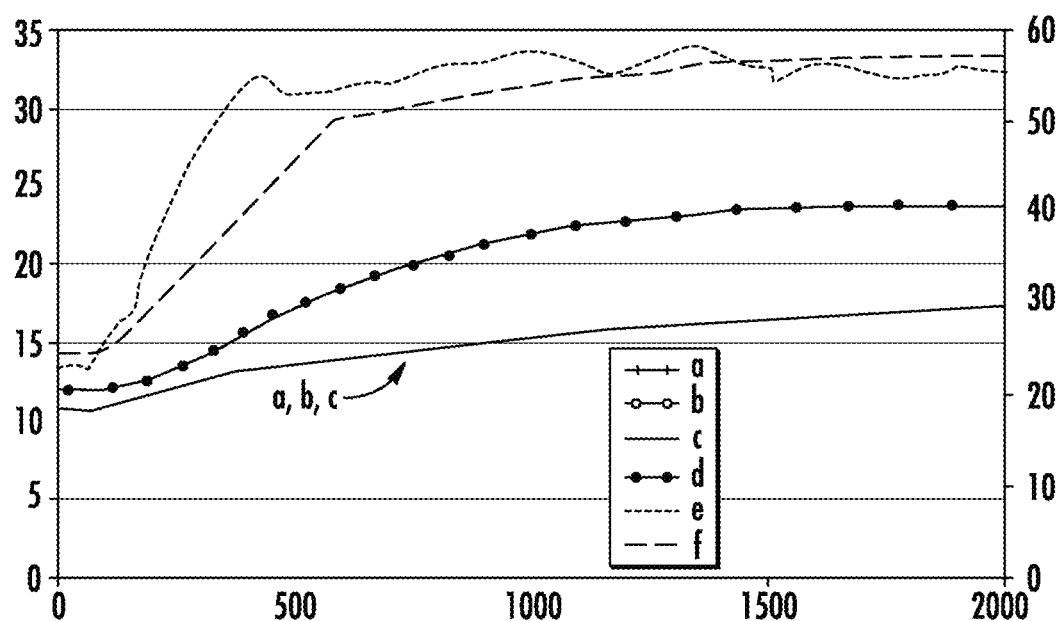
FIG. 3 is a schematic curve diagram of changes in suction and exhaust pressure and the ambient temperature from shutdown to the next start of a unit of a refrigeration system in the prior art.

Referring to FIG. 2 and FIG. 3, schematic curve diagrams of changes in suction and exhaust pressure and the ambient temperature from shutdown to the next start of a unit in the refrigeration system in the foregoing embodiment, and in suction and exhaust pressure and the ambient temperature from shutdown to the next start of a unit in a refrigeration system in the prior art are shown respectively. A curve a represents an exhaust pressure curve, a curve b represents a suction pressure curve, a curve c represents an evaporator pressure curve, a curve d represents a reservoir pressure curve, a curve e represents an ambient temperature curve, and a curve f represents a curve of temperature in a refrigerated container. A horizontal coordinate represents a time axis (unit: s), a vertical coordinate on the left side represents pressure (unit: bar), and a vertical coordinate on the right side represents temperature (unit: ° C.). Upon comparison of curve changes in the figures, it can be known that compared with the prior art (shown in FIG. 3), the solution (shown in FIG. 2) of forming relatively closed space when the compressor is shut down greatly reduces suction and exhaust pressure of the compressor, thus reducing the starting load of the compressor and the power and size of a power source.

When the refrigeration system operates normally, a three-way valve 191 is switched to the refrigeration loop. Subsequently, after being compressed by the compressor 110, the high-temperature and high-pressure vapor-phase refrigerant flows into the condenser 120 via the three-way valve 191, and exchanges heat for heat dissipation with ambient air that is driven by a condenser fan 121 to flow through the condenser 120. Then, the heat-exchanged air flows through a diesel coolant radiator 122, to cool the radiator 122 through heat dissipation. In addition, the cooled liquid-phase refrigerant flows into the reservoir 130 via the first one-way valve 192 that is turned on in a forward direction, and correspondingly a remaining amount of refrigerant is saved in the reservoir 130 according to actual work load of the system. The other part of refrigerant participating in the work cycle continues to flow through a subcooler 140 and is driven by the condenser fan 121 to further cool the liquid-phase refrigerant. Subsequently, the refrigerant is filtered by a dry filter 150, and after secondary heat utilization at a regenerator 170, flows through the second one-way valve 193 that is turned on in a forward direction to the throttle element 195 for expansion throttling. The throttled and depressurized refrigerant enters the evaporator 160 and exchanges heat with ambient air that is driven by an evaporator fan 161 to flow through the evaporator 160, to implement the function of cooling the evaporator 160. The evaporated refrigerant flows through the regenerator 170 and exchanges heat with the refrigerant in the foregoing flow path, then enters the liquid-vapor separator 180 to be filtered, and subsequently enters the compressor 110 through the suction pressure adjustment valve 196 whose opening is adjusted according to the suction pressure, to start a new cycle.

During defrosting of the refrigeration system, the three-way valve 191 is switched to turning on the heat air bypass flow path. Subsequently, after being compressed by the compressor 110, the high-temperature and high-pressure vapor-phase refrigerant flows into the hot refrigerant bypass branch via the three-way valve 191, flows through the third one-way valve 194 that is turned on in the forward direction, and then enters the evaporator 160 to be defrosted. After the defrosting task is completed, the vapor-phase refrigerant is filtered by the liquid-vapor separator 180 and flows back to the compressor 110, to start a new work cycle or defrosting cycle.

The foregoing embodiments mainly describe a refrigeration system and a start control method for a refrigeration system according to the present invention. Although only some of the embodiments of the present invention have been described, it will be apparent to those skilled in the art that the present invention may be implemented in various other forms without departing from the main idea and scope of the present invention. Therefore, the described examples and embodiments shall be considered as exemplary rather than limitative, and the present invention may encompass various modifications and replacements without departing from the spirit and scope of the present invention as defined by the appended claims.

The invention claimed is:

1. A refrigeration system, comprising:
   a refrigeration loop having an exhaust port of a compressor, a condenser, a throttle element, an evaporator, and a suction port of the compressor that are connected in sequence by using a flow path;
   wherein a first valve is disposed between the throttle element and the condenser, and the first valve is at least capable of cutting off a refrigerant flow from the throttle element to the condenser; and a second valve is disposed close to the suction port of the compressor, and the second valve is used to control on/off of a flow path between the evaporator and the compressor;
   a hot refrigerant bypass branch;
   wherein an outlet of the hot refrigerant bypass branch is connected to a flow path between the evaporator and the throttle element, and an inlet of the hot refrigerant bypass branch is connected to a flow path between the compressor and the condenser; wherein a third valve is disposed on the hot refrigerant bypass branch, and the third valve is used to control on/off of the hot refrigerant bypass branch such that the third valve is closed on compressor shut down.

2. The refrigeration system according to claim 1, further comprising a reservoir disposed between the throttle element and the condenser, wherein the first valve is disposed between the reservoir and the condenser.

3. The refrigeration system according to claim 1, further comprising a liquid-vapor separator arranged close to the suction port of the compressor, wherein the second valve is disposed between the liquid-vapor separator and the compressor.

4. The refrigeration system according to claim 1, wherein the third valve is a one-way valve for cutting off the refrigerant flow from the outlet of the hot refrigerant bypass branch to the inlet of the hot refrigerant bypass branch.

5. The refrigeration system according to claim 1, wherein the first valve is a one-way valve for cutting off the refrigerant flow from the throttle element to the condenser; or the first valve is a switch valve used to control on/off of the flow path from the throttle element to the condenser.

6. The refrigeration system according to claim 1, wherein the second valve is a suction pressure adjustment valve used to control an opening of an upstream flow path of the suction port of the compressor.

7. A start control method for a refrigeration system, wherein the refrigeration system comprises a refrigeration loop having an exhaust port of a compressor, a condenser, a throttle element, an evaporator, and a suction port of the compressor that are connected in sequence by using a flow path; a first valve is disposed between the throttle element and the condenser, and the first valve is at least capable of cutting off a refrigerant flow from the throttle element to the condenser; and a second valve is disposed close to the suction port of the compressor, and the second valve is used to control on/off of a flow path between the evaporator and the compressor; wherein the method comprises: turning off the first valve and the second valve when the compressor is shut down;

wherein the refrigeration system further comprises a hot refrigerant bypass branch, an outlet of the hot refrigerant bypass branch is connected to a flow path between the evaporator and the throttle element, and an inlet of the hot refrigerant bypass branch is connected to a flow path between the compressor and the condenser; wherein a third valve is disposed on the hot refrigerant bypass branch, and the third valve is used to control on/off of the hot refrigerant bypass branch; wherein the method comprises: turning off the third valve and shutting down the compressor.

\* \* \* \* \*